US000001047H

United States Statutory Invention Registration [19]

[11] Reg. Number: H1047

Henderson et al.

[43] Published: May 5, 1992

[54] FRAGMENTING NOTCHED WARHEAD ROD

[75] Inventors: William M. Henderson, Ninde; Leonard T. Wilson, Fredericksburg; Charles R. Garnett, Dahlgren, all of Va.

[73] Assignee: The United States of America as represented by the Secretary of the Navy, Washington, D.C.

[21] Appl. No.: 740,524

[22] Filed: Aug. 5, 1991

[51] Int. Cl.[5] ..... F42B 12/32

[52] U.S. Cl. ..... 102/496; 102/364; 102/389; 102/506

[58] Field of Search ..... 102/364, 389, 474, 491, 102/494, 495, 496, 497, 506, 493

[56] References Cited

U.S. PATENT DOCUMENTS

| | | | |
|---|---|---|---|
| H000238 | 3/1987 | Adams | 102/493 |
| 90,164 | 5/1869 | Gibson | 102/493 |
| 1,203,062 | 10/1916 | Semple | 102/389 |
| 3,799,054 | 3/1974 | LaRocca | 102/64 |
| 3,815,504 | 6/1974 | Tieben | 102/67 |
| 3,946,673 | 3/1976 | Hayes | 102/517 |
| 3,977,327 | 8/1976 | Brumfield et al. | 102/67 |
| 4,167,140 | 9/1979 | Biserod | 102/364 |
| 4,216,720 | 8/1980 | Kempton | 102/67 |
| 4,305,333 | 12/1981 | Altenau et al. | 102/306 |
| 4,592,283 | 6/1986 | Hellner et al. | 102/493 |
| 4,644,867 | 2/1987 | Hellner et al. | 102/495 |
| 4,781,117 | 11/1988 | Garnett et al. | 102/493 |

*Primary Examiner*—Harold J. Tudor

*Attorney, Agent, or Firm*—John D. Lewis; Kenneth E. Walden

[57] ABSTRACT

A rod for use in fragmenting warheads is notched so that when it is subjected to an explosive load it will break into individual fragments of predetermined shape and size. Various materials can be used depending on the desired kill mechanism. The rods may be alternated and stacked to combine materials and kill mechanisms.

6 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

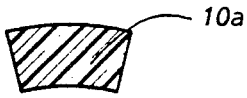
FIG. 3A
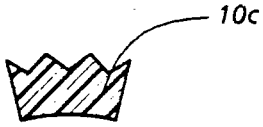
FIG. 3C
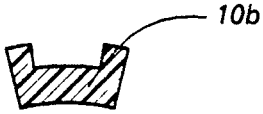
FIG. 3B
FRAGMENT MATERIAL ALTERNATIVES
| MATERIAL | FRAGMENT TYPE | | |
|---|---|---|---|
| | PENETRATING | INCENDIARY | VAPORIFIC |
| STEEL | X | | |
| TUNGSTEN | X | | |
| ZIRCONIUM | | X | |
| ALUMINUM | | | X |
| TITANIUM | | X | X |
| MISCH METAL | | X | |
| MAGNESIUM | | X | X |
| DEPLETED URANIUM | X | X | |
| • | | | |
| • | | | |
| • | | | |
FIG. 4

FIG. 5A
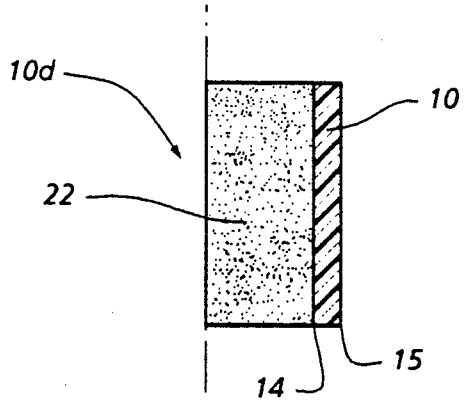
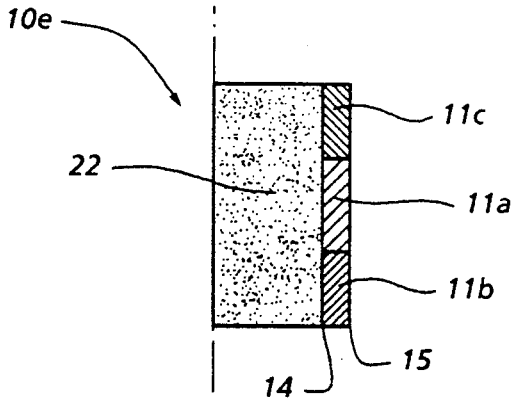
FIG. 5B
FIG. 5C
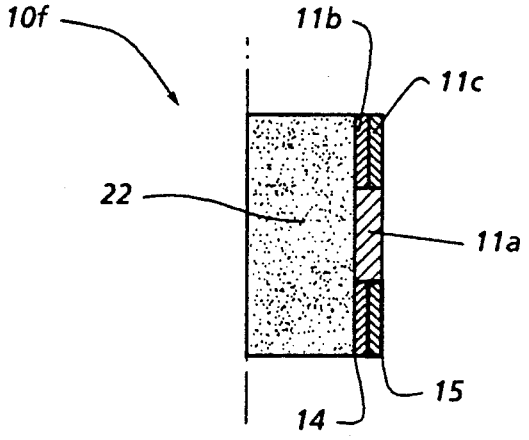

FRAGMENTING NOTCHED WARHEAD ROD

The invention described herein may be manufactured and used by and for the Government of the United States of America for governmental purposes without the payment of any royalties thereon or therefor.

BACKGROUND OF THE INVENTION

The field of the invention is that of ordnance and warhead construction. The present invention relates to fragmentary warhead construction and, in particular, to the construction of warheads using notched fragmenting rods.

In the prior art, most missile fragmentation warheads either use a solid steel case filled with explosive (which is the conventional design) or consist of explosive surrounded by a thin shell with "discrete" fragments glued to the shell which is generally called the discrete fragment design. In either case the warhead is then mounted into the ordnance section where structural loads are carried by a surrounding shroud.

An example of the conventional steel case design is LaRocca, U.S. Pat. No. 3,799,054 filed Mar. 26, 1974. This reference teaches a warhead for controlling the fragmentation of explosive devices having a cylindrical metallic fragmentation casing, wrapped with metallic strips of heavy density to cause fragments to form. This type of construction is limited to ordnance which has a single type of fragment, as the fragments are formed by the metal case. Because the fragmenting section is also load bearing and/or structurally supporting, some fragment materials are precluded. Only those materials which are structurally strong can be used for load bearing elements, thus eliminating many materials that could be used for fragments. In addition, the steel case design either employs heavy materials like LaRocca, or involves complex machining of the warhead case to form the fragments.

An example of discrete fragment design is represented by Brumfield et al., U.S. Pat. No. 3,977,327 filed Aug. 31, 1976. The Brumfield et al. reference is typical of many fragmentation schemes which precut fragments and then must sandwich them between steel or aluminum cylinders which form the case or missile airframe. Construction of this type of warhead is tedious and labor intensive. It is also extremely difficult to manually plane all the fragments in the required matrix pattern with each fragment aligned to precisely form the desired pattern. It is conventional to twist and shake the heavy warhead case to coax each fragment into its proprietary physical position, but gaps and spaces inexorably remain. These irregularities degrade performance and attenuate lethality.

To date, most missile fragmentation warheads use the conventional or discrete fragment design. Both designs have associated advantages and disadvantages. In the conventional design the case is notched or welded to produce the desired fragment break up. The advantages to this design are that it reliably produces uniform size fragments with high velocities, and it is easily produced. One disadvantage to this design is that fragmentation customization is not easily performed. It is inherently difficult (if not impossible) to use fragments of different materials without a performance penalty. Also, changing the fragment size and geometry is not easily accomplished. In contrast, the discrete fragment design allows for easy tailoring of the fragments as fragments of differing materials and geometries are easily utilized, however, this warhead is much more costly to produce as each fragment must be attached to the warhead.

The disadvantages of the conventional design and the discrete fragment design are overcome by the present invention which provides a fragmenting notched rod to replace the discrete fragments used in the discrete fragment type warheads. Each rod replaces a column of fragments constituting up to 100 discrete pieces, thus reducing the labor required for constructing as much as an order of magnitude.

SUMMARY OF THE INVENTION

The present invention consists of a notched rod that may be inserted as a unit into a warhead case to form the fragment matrix. The rod is notched so that when it is subjected to an explosive load it will break into individual fragments. The fragment size can be adjusted by varying the distances between notches, the thickness of the rod, and the rod width. Various materials can be selected to form this notched rod without concern for the strength of the warhead case.

Therefore, an object of the present invention is to teach a device that can form a customized fragment pattern that is easy to manufacture.

It is also an object to teach a method of forming a fragmenting warhead without regard for the load bearing strength or ductility of the material.

It is yet another object of the instant invention to provide a device for forming a discrete fragment warhead that minimizes irregularities in the fragment pattern.

Other objects, advantages and novel features of the invention will become apparent from the following detailed description of the invention when considered in conjunction with the accompanying drawings which show an advantageous embodiment of the invention and wherein like numerals designate like parts in the several figures, and wherein:

BRIEF DESCRIPTION OF THE DRAWINGS

FIG. 3 is an end view of the fragmenting rod of FIG. 2 demonstrating one of many possible geometries.

FIG. 3B is an end view of another possible geometry of the fragmenting rod of FIG. 2.

FIG. 3C is still another end view of yet another possible geometry of the fragmenting rod of FIG. 2.

FIG. 4 is a table of possible materials which might be used in the construction of the rods illustrated in FIG. 2.

FIG. 5A is an illustration of one of the possible shot train arrangements possible using the rods of FIG. 2.

FIG. 5B is another illustration of another possible shot train arrangements possible using the rods of FIG. 2.

FIG. 5C is still another illustration of yet another possible shot train arrangements possible using the rods of FIG. 2.

DETAILED DESCRIPTION

Figure 1:
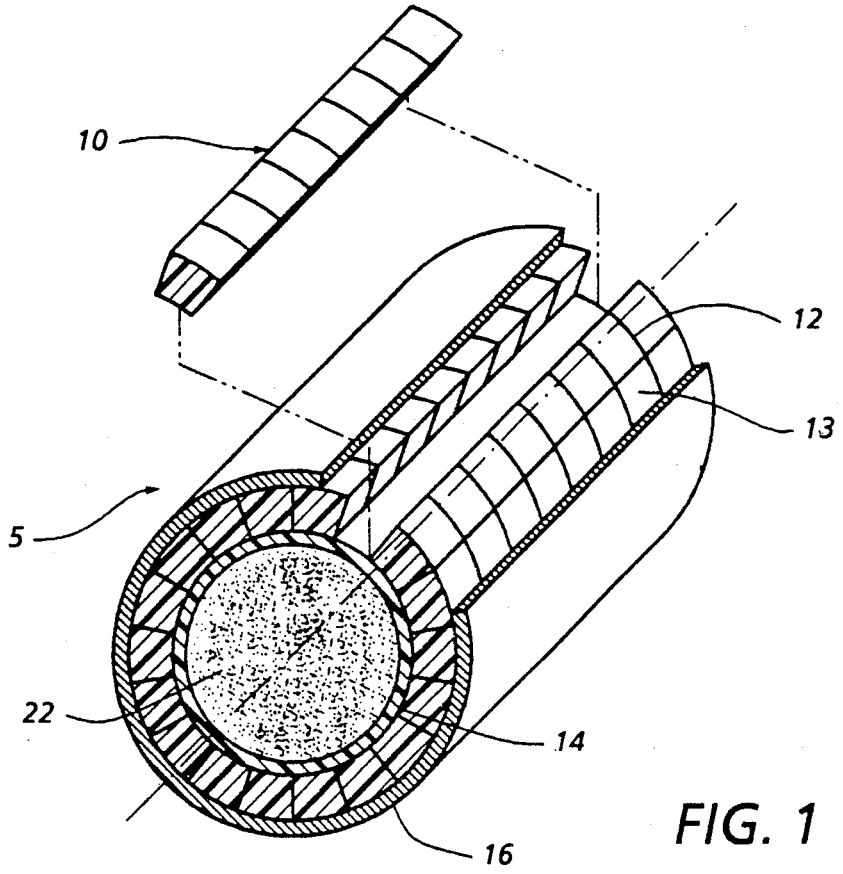
FIG. 1 is a pictorial view of a discrete fragment warhead containing the fragmenting rods of the present invention.

Turning now to FIG. 1, a warhead 5 is shown comprised of an inner case 14 and outer case 16 sandwiching the fragmenting rods 10 of the present invention. The rods 10 illustrated in FIG. 1 are most simply notched with grooves 12 to form individual fragments 13. Warhead 5 is a conventional dual wall warhead containing high explosives (HE), 22, known to those skilled in the art. A novel type of dual wall warhead wherein the inner wall 14 and outer wall 16 are comprised of composite materials is the subject of a separate application entitled Filamentary Composite Dual Wall Discrete Fragment Warhead, Ser. No. 07/740,522, filed even date with this application. The teachings of this related application, while considered nonessential to the claims appended hereto, provide a description of one of the many possible uses of Applicants' fragmenting rods.

On detonation of HE, 22, the rods 10 break into individual fragments 13 which have been designed to exhibit the desired mass, geometry and target kill mechanisms.

Figure 2:
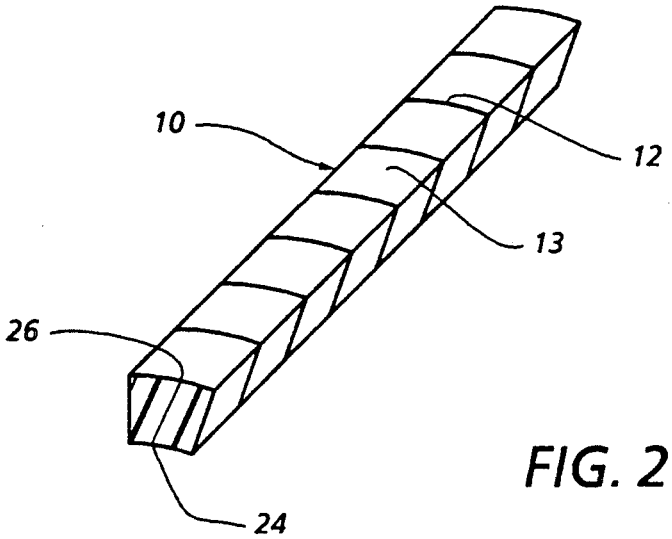
FIG. 2 is an illustration of one of the fragmenting rods of the warhead of FIG. 1

FIG. 2 illustrates an individual rod 10 which is the preferred embodiment for use in the most common type fragmenting warheads. Therein, rod 10 is shaped to have an inner radius 24 which is machined to conform to the outside surface of the inner case wall 14 of a dual case warhead such as illustrated in FIG. 1. Likewise, rod 10 has an outer radius 26 conforming to the inner radius of the outer warhead case 16 so that the fragments 13 formed by many rods 10 fit sandwiched between the dual walls, 14 and 16, of a warhead. It is intuitive to one skilled in the art of warhead technology that the rods might be fixidly attached to either or both of the warhead's walls 14 and 16, and that a plurality of rods 10 might be affixed one to another to form a fragmentation panel or blanket.

Another conventional type warhead would omit outer case 16 on the warhead illustrated in FIG. 1, to form a single walled ordnance case. In this embodiment, rods 10 would have inner radius 24 affixed to the outside surface of the single case of the warhead.

While the rod chosen for illustration in FIG. 2 is notched with grooves 12 to form simple fragment patterns, it is important to note that more complex and/or irregular shaped grooves may be used to form any shape fragments desired.

FIGS. 3A, 3B, and 3C illustrate only three 10*a*, 10*b* and 10*c*, of the infinite number of possible shapes which might be formed in rod 10. Shaping the fragments allows the warhead technician to vary infinitely the mass, lethality and kill mechanisms necessary to accurately tailor the warhead to the expected target.

Rod 10 may be machined, extruded, pultruded, or constructed with a powder metallurgy process such as is disclosed in Hellner, et al., U.S. Pat. No. 4,592,283 filed Jun. 3, 1986. fragment parameters may be obtained using rods 10 by selecting materials and changing geometric shape.

FIG. 4 is a table juxtaposing various conventional fragment materials with the desired fragment kill mechanism. For instance, if the kill mechanism desired is penetration, a steel or tungsten fragment would be appropriate. If an incendiary kill mechanism is needed, then one of the materials in the incendiary column would be chosen. Likewise, a material would be chosen from the vaporific column, which would be utilized to construct rods 10 if special terminal effects were desired.

It is important to note that the materials in table 4 may be metals or metal alloys which the design of fragment parameters would require.

If a combination of kill mechanisms is desired, rods 10 may be used to form panels with the various rods comprised of different materials. Turning to FIG. 5A, the variations possible may be best noted with a series of examples. Version 10*d* is illustrated on a standard warhead wherein HE, 22, is contained within a case 14 with Applicants' rods 10 affixed to the outside of case 14. The rods 10 would be chosen from a material listed in table 4 depending upon the kill mechanism desired. FIG. 5B illustrates another version, 10*e*, depicting a more complex construction wherein rods 11*a*, 11*b*, and 11*c* are constructed of penetrating, incendiary and vaporific materials, respectively. This engenders a fragmentation panel on the warhead exhibiting all three kill mechanisms listed in table 4. FIG. 5C, in version 10*f* illustrates an embodiment wherein rods 11*a* through 11*c* are alternated and also stacked laterally normal to the longitudinal axis of the warhead case as shown with rods 11*a* formed of penetrating material, rods 11*b* of incendiary material and rods 11*c* of vaporific materials.

Obviously, any permutation of materials and geometric positioning may be employed to obtain the precise design and kill mechanism desired and many modifications and variations of the present invention are possible in the light of the above teachings without going outside the scope of Applicants' invention.

What we claim:

1. A fragmenting rod for use in a discrete fragment warhead comprising; a scored rod of preselected material adapted to reside in a fragmenting warhead case.

2. A scored rod according to claim 1 wherein said rod is comprised of alloyed materials selected from the group consisting of steel, tungsten and depleted uranium alloys whereby penetrating fragments are formed.

3. A scored rod according to claim 1 wherein said rod is comprised of alloyed materials selected from the group consisting of zirconium, titanium, misch metal, magnesium and depleted uranium alloys.

4. A scored rod according to claim 1 wherein said rod is comprised of alloyed material selected from the group consisting of aluminum titanium and magnesium alloys.

5. A scored rod according to claim 1 wherein said rod is adapted to be fixedly attached to an outside surface of an inner wall of the warhead.

6. A rodded fragmentation panel for use in a discrete fragment warhead having at least one wall comprised of alternating scored rods of preselected materials wherein said alternating scored rod are comprised of different materials so that the resulting fragment pattern exhibits a plurality of characteristics corresponding to the materials in alternating scored rods.

* * * * *